United States Patent
Matsuda et al.

(10) Patent No.: US 12,405,119 B2
(45) Date of Patent: Sep. 2, 2025

(54) ROUTE GUIDANCE APPARATUS, ROUTE GUIDANCE METHOD, AND PROGRAM

(71) Applicant: NIPPON TELEGRAPH AND TELEPHONE CORPORATION, Tokyo (JP)

(72) Inventors: Osamu Matsuda, Musashino (JP); Shinichiro Eitoku, Musashino (JP); Mitsuru Mochizuki, Musashino (JP); Hitoshi Seshimo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 254 days.

(21) Appl. No.: 18/010,181

(22) PCT Filed: Jun. 19, 2020

(86) PCT No.: PCT/JP2020/024155
§ 371 (c)(1),
(2) Date: Dec. 13, 2022

(87) PCT Pub. No.: WO2021/255923
PCT Pub. Date: Dec. 23, 2021

(65) Prior Publication Data
US 2023/0221131 A1    Jul. 13, 2023

(51) Int. Cl.
*G01C 21/34* (2006.01)
*G01C 21/36* (2006.01)

(52) U.S. Cl.
CPC ..... *G01C 21/3461* (2013.01); *G01C 21/3446* (2013.01); *G01C 21/3617* (2013.01)

(58) Field of Classification Search
CPC ............ G01C 21/3461; G01C 21/3446; G01C 21/3617; G01C 21/3484
See application file for complete search history.

(56) References Cited

U.S. PATENT DOCUMENTS

2016/0187151 A1* 6/2016 Barbieri ............. G01C 21/3679
                                                          701/540
2018/0209811 A1* 7/2018 Olsen ................. G01C 21/3667

FOREIGN PATENT DOCUMENTS

JP    2004069609 A  *  3/2004
JP    2009085809 A  *  4/2009
(Continued)

OTHER PUBLICATIONS

Machine Translation of JP-2004069609-A (Year: 2004).*
(Continued)

*Primary Examiner* — Sahar Motazedi
(74) *Attorney, Agent, or Firm* — Harness, Dickey & Pierce, P.L.C.

(57) ABSTRACT

A route guidance apparatus according to an embodiment of the present disclosure includes a route search unit that performs a route search based on a route search instruction from a user including information indicating a departure place and a destination, a difficulty level calculation unit that calculates a difficulty level for each of the multiple routes obtained as a search result, a required time calculation unit that calculates a required time for each of the multiple routes, a spatial cognitive ability value acquisition unit that acquires a spatial cognitive ability value representing spatial cognitive ability of the user, a route selection unit that selects a route recommended to the user from the multiple routes based on the calculated difficulty level, the calculated required time, and the acquired spatial cognitive ability value, and an output unit that outputs the selected route.

7 Claims, 7 Drawing Sheets

(56) References Cited

FOREIGN PATENT DOCUMENTS

| JP | 2016173348 A | | 9/2016 |
|---|---|---|---|
| JP | 2016183901 A | * | 10/2016 |
| JP | 2018100896 A | | 6/2018 |
| JP | 201935658 A | | 3/2019 |

OTHER PUBLICATIONS

Machine Translation of JP-2009085809-A (Year: 2009).*
Machine Translation of JP-2016183901-A (Year: 2016).*
Yuki Natsubori et al., A method for estimation of travel Time based on pedestrian log, Information Processing Society of Japan 75th National Convention, Mar. 6, 2013.

* cited by examiner

ROUTE GUIDANCE APPARATUS, ROUTE GUIDANCE METHOD, AND PROGRAM

CROSS-REFERENCE TO RELATED APPLICATIONS

This application is a 371 U.S. National Phase of International Application No. PCT/JP2020/024155, filed on Jun. 19, 2020. The entire disclosure of the above application is incorporated herein by reference.

TECHNICAL FIELD

Embodiments of the present disclosure relate to a technique of presenting a route to travel from a departure place to a destination.

BACKGROUND ART

A pedestrian navigation apparatus that presents a user with a route for walking from a departure place to a destination is known. Such a pedestrian navigation apparatus estimates a required time for a route from a distance of the route and an average walking speed (for example, 5 km/h), and presents the required time together with the route.

A technique for calculating a required time for a route in consideration of a change in a walking speed due to an inclination of a road or the like has been proposed (see, for example, NPL 1). According to such a technology, it is possible to more accurately estimate a required time for a route.

CITATION LIST

Non Patent Literature

NPL 1: Yuki Natsubori et al., "A method for estimation of travel time based on pedestrian log", Information Processing Society of Japan, 75 National Convention Lecture Proceedings, 2013 IPSJ-Z75-4V-9.

SUMMARY OF THE INVENTION

Technical Problem

A related-art pedestrian navigation method is based on the premise that a user can reach a destination without getting lost by understanding a route presented by a pedestrian navigation apparatus.

However, there are people who are likely to get lost and people who are not good at reading a map. Such a user may get lost even when using the pedestrian navigation apparatus. In that case, it takes more time than the required time for the user to arrive at the destination. Therefore, the user requires a lot of effort and time to travel, such as leaving early in consideration of the possibility of getting lost.

The present disclosure has been made in view of the above circumstances, and an object thereof is to provide a technique capable of presenting a route suitable for a user.

Means for Solving the Problem

A route guidance apparatus according to an embodiment of the present disclosure includes a route search unit that performs a route search based on a route search instruction, from a user, including information indicating a departure place and a destination, a difficulty level calculation unit that calculates difficulty levels for a plurality of routes obtained as a search result, a required time calculation unit that calculates required times for the plurality of routes, a spatial cognitive ability value acquisition unit that acquires a spatial cognitive ability value representing a spatial cognitive ability of the user, a route selection unit that selects a route recommended to the user from the plurality of routes based on the difficulty levels that are calculated, the required times that are calculated, and the spatial cognitive ability value that is acquired, and an output unit that outputs the route that is selected.

Effects of the Invention

According to the present disclosure, a technology capable of presenting a route suitable for a user is provided.

DESCRIPTION OF EMBODIMENTS

Hereinafter, embodiments of the present disclosure will be described with reference to the drawings.

Figure 1:
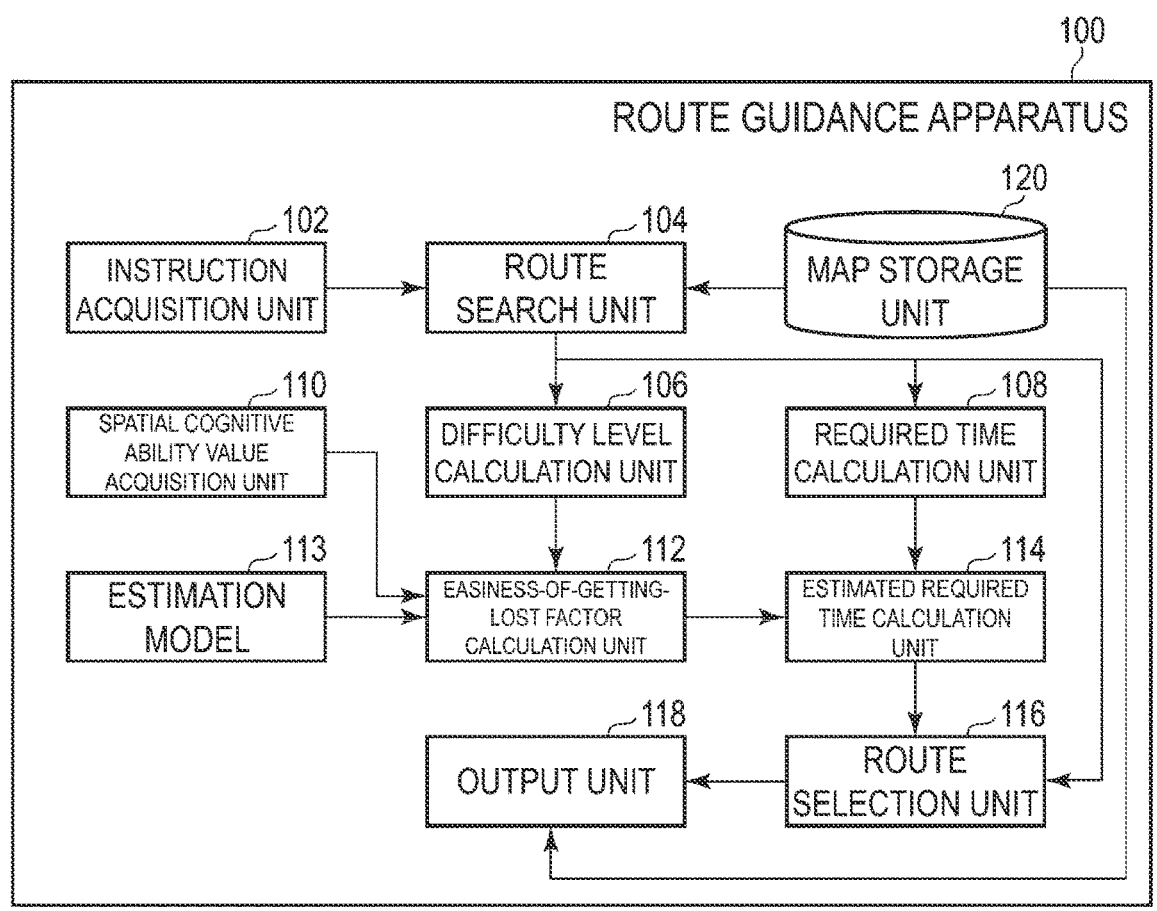
FIG. 1 is a block diagram illustrating a route guidance apparatus according to an embodiment of the present disclosure.

FIG. 1 schematically illustrates a route guidance apparatus 100 according to an embodiment of the present disclosure. The route guidance apparatus 100 is an apparatus that is also referred to as a pedestrian navigation apparatus and proposes a route for a user to walk from a departure place to a destination. For example, the user uses the route guidance apparatus 100 on a user terminal such as a smartphone. The route guidance apparatus 100 may be achieved by application software operating on the user terminal. The route guidance apparatus 100 may be implemented in a server on a communication network such as the Internet.

As illustrated in FIG. 1, the route guidance apparatus 100 includes an instruction acquisition unit 102, a route search unit 104, a difficulty level calculation unit 106, a required time calculation unit 108, a spatial cognitive ability value acquisition unit 110, an easiness-of-getting-lost factor calculation unit 112, an estimated required time calculation unit 114, a route selection unit 116, an output unit 118, and a map storage unit 120. The easiness-of-getting-lost factor calculation unit 112 and the estimated required time calculation unit 114 are collectively referred to as an estimation unit.

The instruction acquisition unit 102 acquires a route search instruction from the user. The route search instruction is an instruction for requesting a route search and includes start point information indicating a departure place (start point) and end point information indicating a destination (end point). The departure place and the destination are designated by the user, for example. A position of the user terminal may be used as the departure place. The position of the user terminal corresponds to a position of the user carrying the user terminal.

The route search unit 104 receives the route search instruction from the instruction acquisition unit 102. The route search unit 104 refers to map information stored in the map storage unit 120 and searches for a route to travel from the departure place indicated by the start point information to the destination indicated by the end point information. The route search unit 104 transmits route information indicating a route from the departure place to the destination obtained as a search result to the difficulty level calculation unit 106, the required time calculation unit 108, and the route selection unit 116.

The difficulty level calculation unit 106 receives the route information from the route search unit 104. The difficulty level calculation unit 106 calculates a difficulty level of the route indicated by the route information and transmits difficulty level information indicating the difficulty level of the route to the easiness-of-getting-lost factor calculation unit 112.

The required time calculation unit 108 receives the route information from the route search unit 104. The required time calculation unit 108 calculates the required time for the route indicated by the route information and transmits the required time information indicating the required time for the route to the estimated required time calculation unit 114 and the route selection unit 116. The required time for the route may be the time estimated to be taken by a typical user to travel along the route from the departure place to the destination.

The spatial cognitive ability value acquisition unit 110 acquires a spatial cognitive ability value representing spatial cognitive ability of the user and transmits the spatial cognitive ability value of the user to the easiness-of-getting-lost factor calculation unit 112. It is sufficient that the spatial cognitive ability value acquisition unit 110 acquires the spatial cognitive ability value of the user once. For example, the spatial cognitive ability value acquisition unit 110 performs processing of acquiring a spatial cognitive ability value when the user uses the route guidance apparatus 100 for the first time. Alternatively, the spatial cognitive ability value acquisition unit 110 may periodically perform processing of acquiring the spatial cognitive ability value.

The easiness-of-getting-lost factor calculation unit 112 receives the difficulty level information from the difficulty level calculation unit 106 and receives the spatial cognitive ability value of the user from the spatial cognitive ability value acquisition unit 110. The easiness-of-getting-lost factor calculation unit 112 calculates easiness-of-getting-lost factor of the route on the basis of the difficulty level of the route indicated by the difficulty level information and the spatial cognitive ability value of the user and transmits the easiness-of-getting-lost factor of the route to the estimated required time calculation unit 114. The easiness-of-getting-lost factor of the route represents the easiness of getting lost in the route for the user, that is, the likelihood that the user will get lost with respect to the route.

In the present embodiment, the easiness-of-getting-lost factor calculation unit 112 holds an estimation model 113 that uses the difficulty level and the spatial cognitive ability value as inputs and outputs the easiness-of-getting-lost factor. The estimation model 113 can be a learned model obtained by machine learning, such as a linear regression model or a support vector machine regression model. The easiness-of-getting-lost factor calculation unit 112 applies the difficulty level indicated by the difficulty level information and the spatial cognitive ability value acquired by the spatial cognitive ability value acquisition unit 110 to the estimation model 113, thereby obtaining the easiness-of-getting-lost factor output from the estimation model 113.

The estimated required time calculation unit 114 receives the required time information from the required time calculation unit 108 and receives the easiness-of-getting-lost factor from the easiness-of-getting-lost factor calculation unit 112. The estimated required time calculation unit 114 calculates an estimated required time for the route (also referred to as an estimated travel time) on the basis of the required time indicated by the required time information and the easiness-of-getting-lost factor and transmits estimated required time information indicating the estimated required time for the route to the route selection unit 116. The estimated required time may be a time estimated to be required for the user who has instructed the route search to travel from the departure place to the destination along the route.

The route selection unit 116 receives route search information from the route search unit 104 and receives estimated required time information from the estimated required time calculation unit 114. Typically, the route search unit 104 obtains a plurality of routes as a search result. The difficulty level calculation unit 106, the required time calculation unit 108, the easiness-of-getting-lost factor calculation unit 112, and the estimated required time calculation unit 114 perform processing for each route. Therefore, the route information indicates a plurality of routes, and the estimated required time information indicates the estimated required time for each of the plurality of routes.

The route selection unit 116 selects a route recommended to the user from among the plurality of routes indicated by the route information on the basis of the estimated required time indicated by the estimated required time information. For example, the route selection unit 116 selects a route having the shortest estimated required time. The route selection unit 116 transmits route guidance information indicating the selected route and the estimated required time related to the selected route to the output unit 118.

The output unit 118 receives the route guidance information from the route selection unit 116. The output unit 118 outputs the route and the estimated required time indicated by the route guidance information. The output unit 118 further refers to the map information stored in the map storage unit 120. The output unit 118 displays information on a display device of the user terminal. Specifically, the output unit 118 displays the route on the map and further displays the estimated required time. The output is not limited to display and may be another method such as voice. For example, the output unit 118 may output the estimated required time by voice through a speaker of the user terminal.

In a case where the route guidance apparatus 100 is implemented in a server, the instruction acquisition unit 102 may acquire the route search instruction from the user via the user terminal. The spatial cognitive ability value acquisition unit 110 may acquire the spatial cognitive ability value via the user terminal. The output unit 118 may transmit the route guidance information to the user terminal. The user terminal receives the route guidance information from the server and displays the route guidance information.

More detailed description of the route guidance apparatus 100 will be given below.

The map information stored in the map storage unit 120 includes a link indicating a road and a node indicating a joint of the links. A branch point such as an intersection (for example, a crossroad or a T-junction) is set as the node. A point at which a road attribute such as a slope and an effective width changes may be further set as the node.

The difficulty level calculation unit 106 calculates the difficulty level of the route according to the following Equation (1).

$$Rd = \alpha_1 \cdot a_1 + \alpha_2 \cdot a_2 + \alpha_3 \cdot a_3 + \alpha_4 \cdot a_4 \qquad (1)$$

Here, Rd represents a difficulty level of a route, $\alpha_1$ represents the number of nodes at which turning is performed on the route, $\alpha_2$ represents the number of nodes through which passing is performed on the route, $\alpha_3$ represents the number of movements between floors included in the route, $\alpha_4$ represents a building number density in a geographic mesh including the route, and $\alpha_1$, $\alpha_2$, $\alpha_3$, and $\alpha_4$ represent weights. Passing through the node represents that the traveling direction is not changed at the node.

The weights $\alpha_1$, $\alpha_2$, $\alpha_3$, and $\alpha_4$ are determined in advance. In the present embodiment, the difficulty level of the route is designed such that the larger the value, the more difficult the route is. In this case, the weights $\alpha_1$, $\alpha_2$, $\alpha_3$, and $\alpha_4$ take positive values so that the larger the elements $a_1$, $a_2$, $a_3$, and $a_4$, the higher the difficulty level. The route search unit 104 may calculate the values of the elements $a_1$, $a_2$, $a_3$, and $a_4$ at the time of search, include the values of the elements $a_1$, $a_2$, $a_3$, and $a_4$ in the route information, and transmit the route information to the difficulty level calculation unit 106.

Figure 2A:
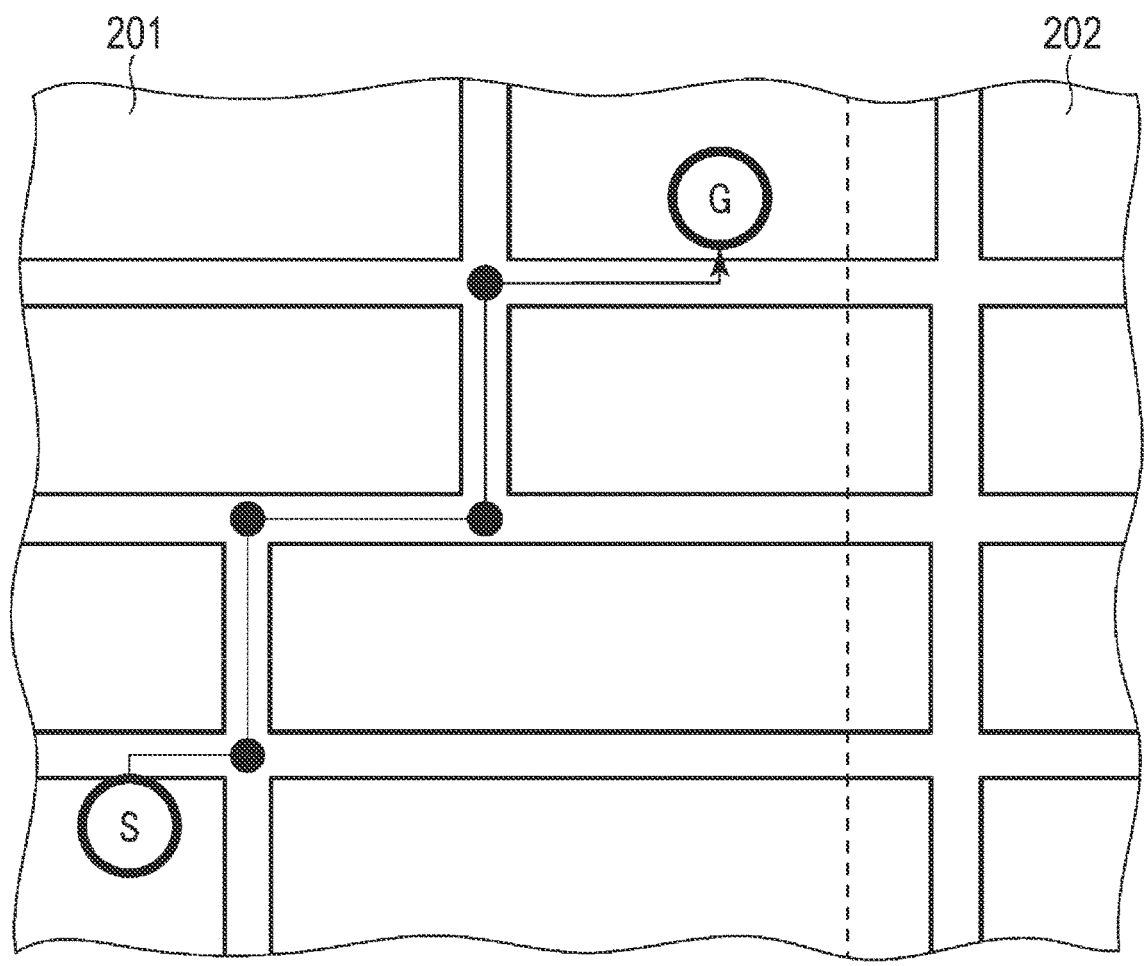
FIG. 2A is a diagram illustrating an example of a route.
Figure 2B:
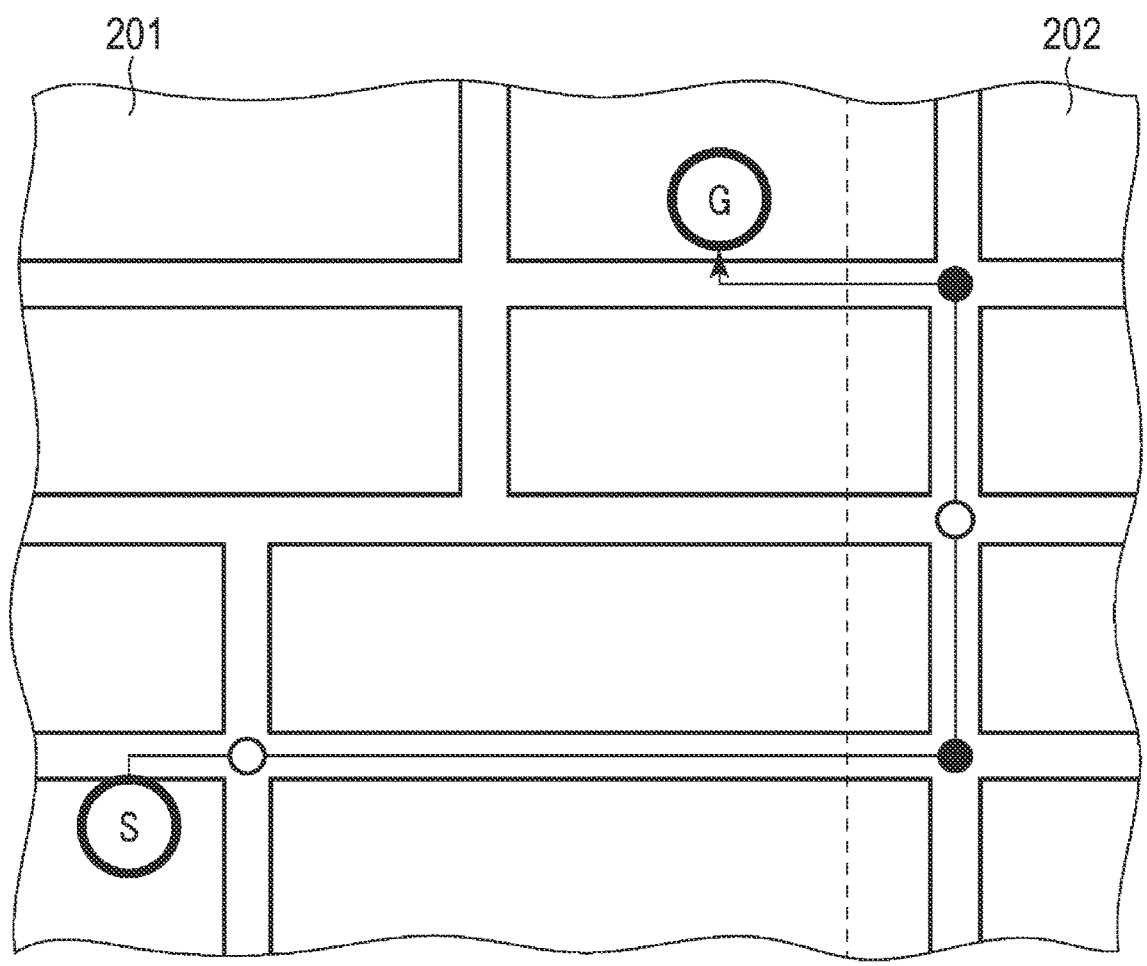
FIG. 2B is a diagram illustrating another example of the route.

FIGS. 2A and 2B schematically illustrate a route from a departure place S to a destination G obtained by the route search unit 104. The route illustrated in FIG. 2A is referred to as a first route, and the route illustrated in FIG. 2B is referred to as a second route. The first route is the shortest route, that is, a route having the shortest required time. In the first route, the user turns at four intersections (indicated by black circles), and there is no intersection through which the user passes without turning. In this case, $a_1=4$ and $a_2=0$ hold. The second route is a detour route. On the second route, the user turns at two intersections (indicated by black circles) and goes straight at two intersections (indicated by white circles). In this case, $a_1=2$ and $a_2=2$ hold.

As a search result, a route including movement in a facility may be obtained. For example, when there is a track between the departure place and the destination, a route including movement in a railroad station may be obtained. When the route includes route portions of going up from the first floor to the second floor by stairs in the railroad station and going down from the second floor to the first floor by another stair in the railroad station, $a_3=2$ holds.

The geographic mesh is obtained by dividing a region into meshes on the basis of, for example, latitude and longitude. The geographic mesh may be, for example, a square shape with a side length of 1 km. A building number density for each geographic mesh may be included in the map information or may be registered in a database (not illustrated). The building number density is the number of buildings in a geographic mesh divided by the area of the geographic mesh (for example, 1 km$^2$). In FIGS. 2A and 2B, a broken line represents a boundary between a geographic mesh 201 and a geographic mesh 202. The first route is included in the geographic mesh 201, and the element $a_4$ is the building number density in the geographic mesh 201. The second route spans the geographic meshes 201 and 202, and the element $a_4$ is an average value of the building number density in the geographic mesh 201 and the building number density in the geographic mesh 202.

The element $a_4$ may not be based on the geographic mesh, as long as it is the building number density in the region including the route. For example, the difficulty level calculation unit 106 may set a rectangular region including the entire route and calculate the element $a_4$ by dividing the number of buildings in the rectangular region by the area of the rectangular region.

The above Equation (1) is an example of difficulty level calculation. The difficulty level calculation unit 106 may calculate the difficulty level of the route according to, for example, the following Equation (2).

$$Rd = f_1(a_1) + f_2(a_2) + f_3(a_3) + f_4(a_4) \qquad (2)$$

Here, the functions $f_1$, $f_2$, $f_3$, and $f_4$ are monotonically increasing functions.

Only a part of the four elements $a_1$, $a_2$, $a_3$, and $a_4$ may be used. For example, the difficulty level calculation unit 106 may calculate the difficulty level of the route according to the following Equation (3).

$$Rd = \alpha_1 \cdot a_1 + \alpha_2 \cdot a_2 \qquad (3)$$

Only one element (for example, element $a_1$) may be used. Elements other than the four elements $a_1$, $a_2$, $a_3$, and $a_4$ may be used.

The required time calculation unit 108 may calculate the required time from a distance of the route and a walking speed. For example, the required time calculation unit 108 may calculate the required time by dividing the distance of the route by the walking speed. The required time calculation unit 108 may use a preset value (for example, 5 km/h as an average walking speed of a typical user) as the walking speed. The walking speed may be changed according to an input by the user. The user selects any one of "slow", "slightly slow", "normal", and "fast" as the walking speed. The walking speed is set to 3 km/h in a case where the user selects "slow", 4 km/h in a case where the user selects "slightly slow", 5 km/h in a case where the user selects "normal", and 6 km/h in a case where the user selects "fast".

The required time calculation unit 108 may calculate the required time in consideration of a change in walking speed due to an inclination of a road or the like. The required time calculation unit 108 refers to the map information stored in the map storage unit 120 to obtain the distance and the slope (inclination angle) of the road inclined in the route. The required time calculation unit 108 may use a walking speed multiplied by a factor corresponding to a slope on an inclined road. The factor is set to a value larger than 1 on the uphill. For example, the factor is set to 0.9 when the slope is in the range of 1 to 2% and 0.8 when the slope is in the range of 2 to 3%. For example, in a case where the walking speed is set to 5 km/h and the slope is 2.5%, the walking speed is corrected to 4 km/h.

The spatial cognitive ability is evaluated in a plurality of stages. In the present embodiment, the spatial cognitive ability is evaluated on a five-point scale, and the spatial cognitive ability value takes an integer value from 1 to 5. For example, the spatial cognitive ability value is defined such that a higher value indicates a higher spatial cognitive ability. Specifically, a spatial cognitive ability value of 1 indicates that the user has very low spatial cognitive ability. A spatial cognitive ability value of 2 indicates that the user has low spatial cognitive ability. A spatial cognitive ability value of 3 indicates that the user has normal (average) spatial cognitive ability. A spatial cognitive ability value of 4 indicates that the user has high spatial cognitive ability. A spatial cognitive ability value of 5 indicates that the user has very high spatial cognitive ability.

The spatial cognitive ability value acquisition unit 110 may present a questionnaire to the user and calculate the spatial cognitive ability value on the basis of an answer from the user to the questionnaire. For example, the spatial cognitive ability value acquisition unit 110 may present a questionnaire to the user when the route guidance apparatus 100 is used for the first time.

As an example, the questionnaire includes the following eight questions.

Self-Assessment
- (1) I often get lost.
- (2) I am good at reading maps.

First Factor (Direction and Rotation)
- (3) Even if checking the map in advance, I have difficulty in going to a place I have never been before.
- (4) It is easy for me to find the position where I am on the map.
- (5) I have confidence in the direction of walking and tend to get to the destination even when it is a place I have never been before.

Second Factor (Memory and Discrimination)
- (6) I tend to forget which direction I have turned.
- (7) Even in a place I have been many times, I often do not remember a mark for finding the place well.
- (8) Even if a person teaches me in detail by words, I often cannot go along the road correctly.

The user answers each item on a five-point scale. For example, for each question, the user selects one from five options of "applicable", "slightly applicable", "neither", "not very applicable", and "not applicable". The spatial cognitive ability value acquisition unit 110 scores the answers to the eight questions, with 1 point for "applicable", 2 points for "slightly applicable", 3 points for "neither", 4 points for "not very applicable", and 5 points for "not applicable". The spatial cognitive ability value acquisition unit 110 sets the spatial cognitive ability value to 1 when the total score is 8 to 12, sets the spatial cognitive ability value to 2 when the total score is 13 to 19, sets the spatial cognitive ability value to 3 when the total score is 20 to 28, sets the spatial cognitive ability value to 4 when the total score is 29 to 35, and sets the spatial cognitive ability value to 5 when the total score is 36 to 40.

Weighting may be done depending on the question. For example, for each of the questions (1) and (2), the score may be weighted by a factor of two. In this case, in a case where the user selects "not applicable" for the question (1), the score is 10 points. In an embodiment, the total score as it is may be used as the spatial cognitive ability value.

The estimated required time calculation unit 114 obtains the estimated required time by calculating the getting-lost time of the route on the basis of the required time for the route and the easiness-of-getting-lost factor of the route and adding the getting-lost time of the route to the required time for the route. The getting-lost time of the route indicates a difference obtained by subtracting the required time for the route from the time estimated to be taken by the user to travel from the departure place to the destination along the route. In other words, the getting-lost time of the route indicates a time estimated to be longer than the required time when the user who has instructed the route search travels from the departure place to the destination along the route.

The easiness-of-getting-lost factor may be designed so that the getting-lost time is determined by multiplying the easiness-of-getting-lost factor by the required time. As described above, the easiness-of-getting-lost factor represents the easiness of getting lost in the route. The easiness of getting lost in the route represents the difficulty level of the route for the user who has instructed the route search. On the other hand, the difficulty level of the route calculated by the difficulty level calculation unit 106 represents the difficulty level for a typical user and is an objective criterion.

The estimated required time calculation unit 114 obtains the getting-lost time by multiplying the required time for the route by the easiness-of-getting-lost factor. In the embodiment in which a walking speed is changed by an input from the user, the required time used for calculating the getting-lost time may be a required time calculated on the basis of a walking speed set according to an input from the user or may be a required time calculated on the basis of a preset walking speed (for example, 5 km/h).

For a person who is likely to get lost, there is a case where the time required for travel can be shortened as a result by guiding a simple route rather than guiding the shortest route. The route selection unit 116 selects a route on which the user can efficiently travel. Specifically, the route selection unit 116 selects a route having the shortest estimated required time from a plurality of routes obtained as a search result.

It is assumed that a user A having high spatial cognitive ability and a user B having low spatial cognitive ability designate the same departure place and the same destination and instruct a route search. At this time, it is assumed that a first route illustrated in FIG. 2A and a second route illustrated in FIG. 2B are obtained as search results. The first route is the shortest route but has a high difficulty level. The second route has a lower difficulty level than that of the first route. The required time for the first route is represented by $T_1$, and the required time for the second route is represented by $T_2$. Here, $T_1 < T_2$ holds. For a user A, the getting-lost time of the first route is represented by $L_{1a}$, and the getting-lost time of the second route is represented by $L_{2a}$. For a user B, the getting-lost time of the first route is represented by $L_{1b}$, and getting-lost time of the second route is represented by $L_{2b}$.

It is assumed that $(T_1 + L_{1a}) < (T_2 + L_{2a})$ holds for the user A. That is, the estimated required time for the first route is shorter than the estimated required time for the second route. In this case, the route selection unit 116 selects the first route as a route recommended to the user. On the other hand, it is assumed that $(T_1 + L_{1b}) > (T_2 + L_{2b})$ holds for the user B. That is, the estimated required time for the second route is shorter than the estimated required time for the first route. In this case, the route selection unit 116 selects the second route as a route recommended to the user.

As described above, even under the same route search condition, different routes are selected and presented according to the spatial cognitive ability of the user. Specifically, a route with a high difficulty level is presented to the user A having a high spatial cognitive ability, and a route with a low difficulty level is presented to the user B having a low spatial cognitive ability. A route estimated that the user can arrive at the destination in a shorter time is presented to the user.

Note that the route selection unit 116 may select two or more routes among a plurality of routes obtained as a search result. For example, the route selection unit 116 may select a predetermined number of routes in ascending order of the estimated required time from a plurality of routes obtained as a search result. For example, when the route selection unit 116 is configured to select three routes, the route selection unit 116 selects a route having the shortest estimated required time, a route with the second shortest estimated required time, and a route with the third shortest estimated required time.

The output unit 118 may output information on one or a plurality of routes selected by the route selection unit 116. The output unit 118 may output the required time for the route and/or the getting-lost time instead of or in addition to the estimated required time.

Figure 3:
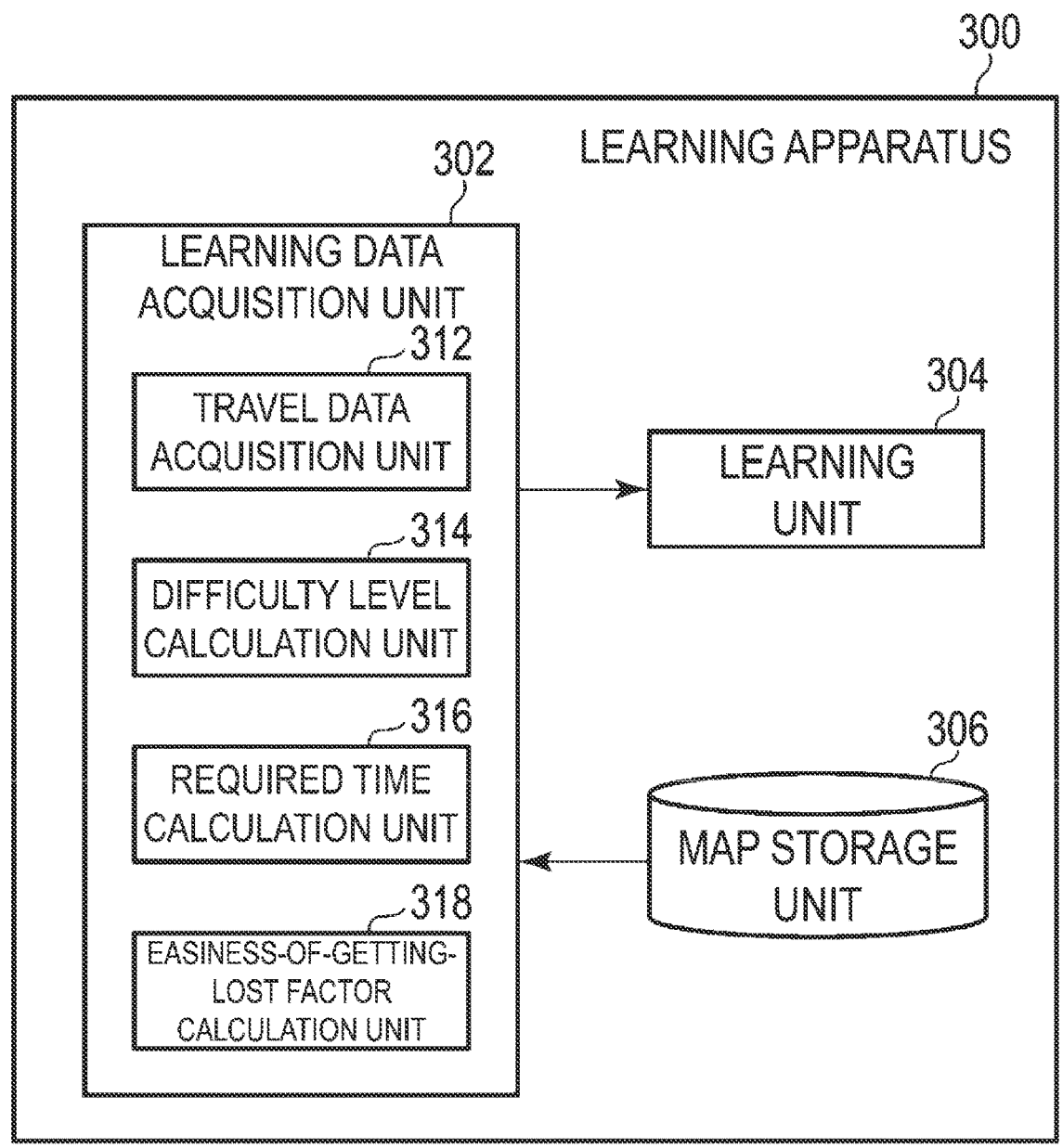
FIG. 3 is a block diagram illustrating a learning apparatus according to an embodiment of the present disclosure.

FIG. 3 schematically illustrates a learning apparatus 300 according to an embodiment of the present disclosure. The learning apparatus 300 illustrated in FIG. 3 is an example of a learning apparatus that performs learning on an estimation model 113 illustrated in FIG. 1. The learning apparatus 300 may be implemented in a computer apparatus different from the computer apparatus in which the route guidance apparatus 100 is implemented. Alternatively, the learning apparatus 300 and the route guidance apparatus 100 may be implemented in the same computer apparatus. In the example illustrated in FIG. 3, the learning apparatus 300 includes a learning data acquisition unit 302, a learning unit 304, and a map storage unit 306. The map storage unit 306 stores map information.

The learning data acquisition unit 302 acquires teacher data, that is, learning data used for supervised learning. The teacher data includes a large number of data sets, and each data set includes a difficulty level of the route, a spatial cognitive ability value of the user, and an easiness-of-getting-lost factor of the route. In the example illustrated in FIG. 3, the learning data acquisition unit 302 includes a travel data acquisition unit 312, a difficulty level calculation unit 314, a required time calculation unit 316, and an easiness-of-getting-lost factor calculation unit 318.

The travel data acquisition unit 312 acquires travel data including a plurality of travel logs from a server (not illustrated). Each travel log is a record in which the user has traveled a route, and includes user information, route information, and actual travel time information. The user information is information regarding the user. In the present embodiment, the user information includes the spatial cognitive ability value of the user, so that the travel data acquisition unit 312 functions as a spatial cognitive ability value acquisition unit. The spatial cognitive ability value of the user is calculated in a manner similar to that described with respect to the route guidance apparatus 100 (FIG. 1). The route information includes information for specifying a route along which the user has traveled. The actual travel time information indicates an actual travel time, that is, a time actually taken for the user to travel from the departure place to the destination along the route.

The difficulty level calculation unit 314 calculates the difficulty level of the route. The difficulty level calculation unit 314 calculates the difficulty level of the route in a manner similar to that of the difficulty level calculation unit 106 illustrated in FIG. 1. Therefore, a detailed description of the difficulty level calculation unit 314 will be omitted. For example, the difficulty level calculation unit 314 calculates the difficulty level of the route according to the above Equation (1). The route information may include values of the elements $a_1$, $a_2$, $a_3$, and $a_4$. Alternatively, the difficulty level calculation unit 314 may determine the values of the elements $a_1$, $a_2$, $a_3$, and $a_4$ by referring to the map information using the route information included in each travel log.

The required time calculation unit 316 calculates the required time for the route. The required time calculation unit 316 may calculate the required time for the route in a manner similar to that of the required time calculation unit 108 illustrated in FIG. 1. Therefore, a detailed description of the required time calculation unit 316 will be omitted. For example, the required time calculation unit 316 may calculate the required time for the route from the distance of the route indicated by the route information included in each travel log and a preset walking speed (for example, 5 km/h).

The easiness-of-getting-lost factor calculation unit 318 calculates an easiness-of-getting-lost factor of the route on the basis of the required time calculated by the required time calculation unit 316 and the actual travel time indicated by the actual travel time information. The easiness-of-getting-lost factor is based on the ratio between the actual travel time and the required time. For example, the easiness-of-getting-lost factor calculation unit 318 calculates the easiness-of-getting-lost factor according to the following Equation (4).

$$c = t_a/t_r - 1 \quad (4)$$

Here, c represents an easiness-of-getting-lost factor, $t_a$ represents an actual travel time, and $t_r$ represents a required time.

The difficulty level calculation unit 314, the required time calculation unit 316, and the easiness-of-getting-lost factor calculation unit 318 perform processing for each travel log. As a result, the learning data acquisition unit 302 generates a plurality of data sets from the plurality of travel logs and outputs the plurality of data sets as teacher data.

The learning unit 304 receives the teacher data from the learning data acquisition unit 302. The learning unit 304 uses the teacher data to perform learning on an estimation model that uses the difficulty level of the route and the spatial cognitive ability value of the user as inputs and outputs an easiness-of-getting-lost factor. As the estimation model, a linear regression model (for example, a multiple regression analysis model), a support vector machine regression model, or the like can be used. The estimation model based on the multiple regression analysis algorithm can be a relational expression in which the difficulty level of the route and the spatial cognitive ability value of the user are two explanatory variables, and the easiness-of-getting-lost factor is an objective variable. In this case, the learning is to determine an intercept and two partial regression coefficients corresponding to the two explanatory variables. The learning unit 304 outputs the learned estimation model.

The above-described easiness-of-getting-lost factor is defined as a value obtained by subtracting 1 from a value obtained by dividing the actual travel time by the required time as shown in the above Equation (4). In an embodiment, the easiness-of-getting-lost factor may be defined as a value obtained by dividing the actual travel time by the required time as shown in the following Equation (5).

$$c = t_a/t_r \quad (5)$$

In this case, the estimated required time calculation unit 114 of the route guidance apparatus 100 obtains the estimated required time by multiplying the required time for the route by the easiness-of-getting-lost factor of the route.

Note that each travel log may further include difficulty level information indicating the difficulty level of the route and/or required time information indicating the required time for the route. In this case, the difficulty level calculation unit 314 and/or the required time calculation unit 316 may be deleted.

Figure 4:
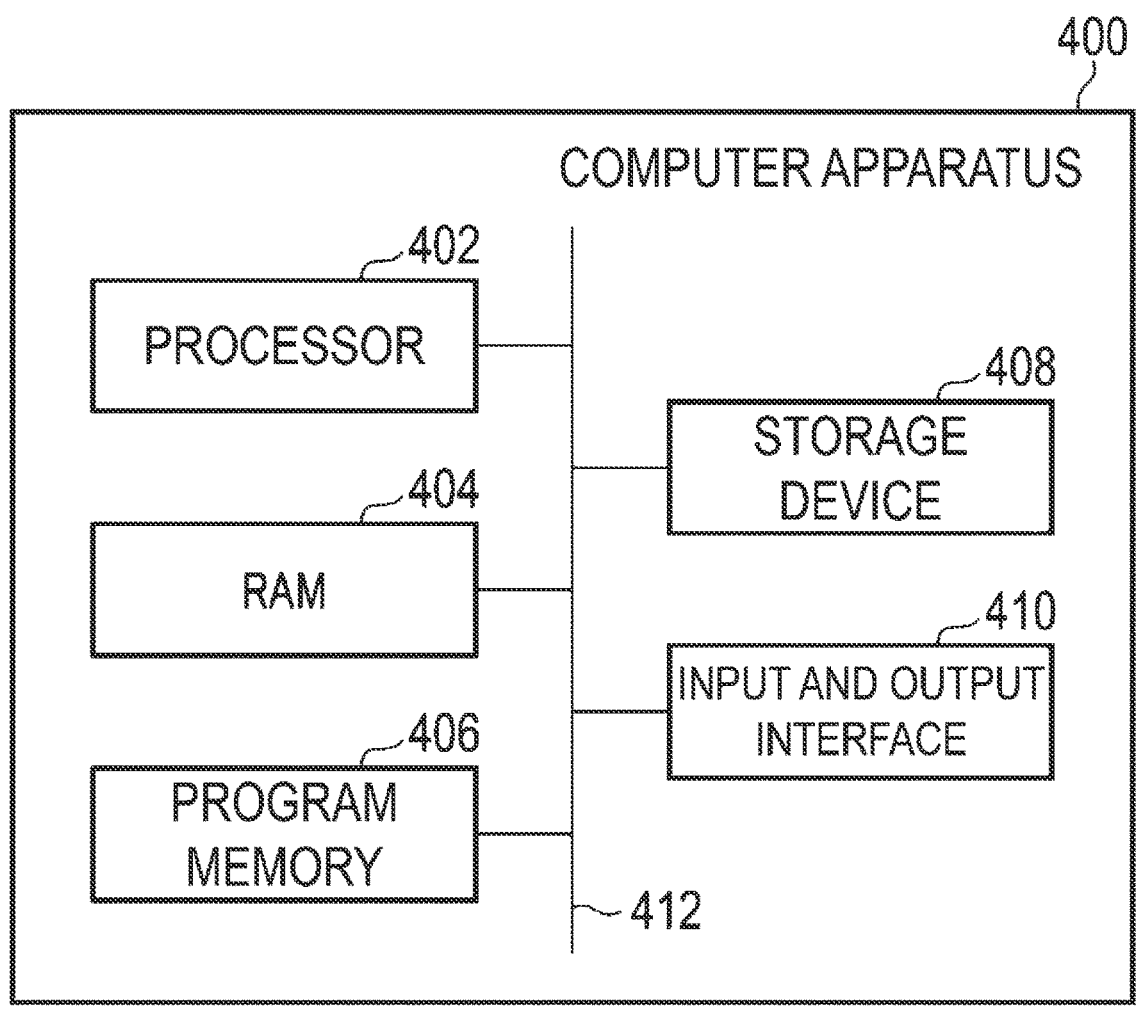
FIG. 4 is a block diagram illustrating a hardware configuration example of a computer apparatus according to an embodiment of the present disclosure.

FIG. 4 schematically illustrates a hardware configuration example of a computer apparatus 400 according to an embodiment of the present disclosure. The computer apparatus 400 illustrated in FIG. 4 may be a personal computer, a server, a smartphone, a tablet computer, or the like. The computer apparatus 400 corresponds to the route guidance apparatus 100 illustrated in FIG. 1 and/or the learning apparatus 300 illustrated in FIG. 3.

As illustrated in FIG. 4, the computer apparatus 400 includes a processor 402, a random access memory (RAM) 404, a program memory 406, a storage device 408, an input and output interface 410, and a bus 412. The processor 402 exchanges signals with the RAM 404, the program memory 406, the storage device 408, and the input and output interface 410 via the bus 412.

The processor 402 typically includes a general-purpose circuit such as a central processing unit (CPU) or a graphics processing unit (GPU). The RAM 404 is used as a working memory by the processor 402. The RAM 404 includes a volatile memory such as a synchronous dynamic random access memory (SDRAM). The program memory 406 stores a program, executed by the processor 402, including a route guidance program and/or a learning program. The program includes a computer-executable instruction. As the program memory 406, a read-only memory (ROM), for example, is used.

The processor 402 loads the program stored in the program memory 406 into the RAM 404, and interprets and executes the program. When the route guidance program is executed by the processor 402, it causes the processor 402 to perform the processing that has been described for the route guidance apparatus 100. When the learning program is executed by the processor 402, it causes the processor 402 to perform the processing that has been described for the learning apparatus 300.

The program may be provided to the computer apparatus 400 in a state in which the program is stored in a computer-readable recording medium. In this case, the computer apparatus 400 includes a drive for reading data from the recording medium and acquires the program from the recording medium, for example. Examples of the recording medium include a magnetic disk, an optical disk (a CD-ROM, a CD-R, a DVD-ROM, a DVD-R, and the like), a magneto-optical disk (an MO and the like), and a semiconductor memory. Alternatively, the program may be stored in a server on the network, and the computer apparatus 400 may download the program from the server.

The storage device 408 stores data such as map information. The storage device 408 includes a non-volatile memory such as a hard disk drive (HDD) or a solid state drive (SSD). A partial region of the storage device 408 may be used as the program memory 406.

The input and output interface 410 may include an input apparatus that inputs data and an output apparatus that outputs data. For example, in a case where the computer apparatus 400 is a portable terminal such as a smartphone, the input and output interface 410 may include a touch screen, a microphone, and a speaker. The input and output interface 410 may include a terminal for connecting a peripheral device. Examples of the peripheral device include a keyboard, a mouse, and a display device. The input and output interface 410 may include a communication module for communicating with an external apparatus. The communication module may be a wired module or a wireless module. The input and output interface 410 is used for a route search instruction from the user, acquisition of a spatial cognitive ability value of the user, and output of route guidance information.

In a case where the computer apparatus 400 is a portable terminal such as a smartphone, the computer apparatus 400 may further include a global positioning system (GPS) receiver (not illustrated) to estimate a self position. The GPS receiver receives a signal from a GPS satellite and transmits the received signal to the processor 402. The processor 402 detects a position of the computer apparatus 400 on the basis of the received signal.

At least a part of the processing described with respect to the route guidance apparatus 100 illustrated in FIG. 1 may be performed by a dedicated circuit such as an application specific integrated circuit (ASIC) or a field programmable gate array (FPGA). Furthermore, at least a part of the processing described with respect to the learning apparatus 300 illustrated in FIG. 3 may be performed by a dedicated circuit such as an ASIC or an FPGA.

The route guidance apparatus 100 may be implemented by two or more computer apparatuses. For example, some components of the route guidance apparatus 100 may be implemented by a first computer apparatus, and the remaining components of the route guidance apparatus 100 may be implemented by a second computer apparatus in communication with the first computer apparatus. As similar to this, the learning apparatus 300 may be implemented by two or more computer apparatuses.

Next, the operation of the route guidance apparatus 100 illustrated in FIG. 1 will be described.

Figure 5:
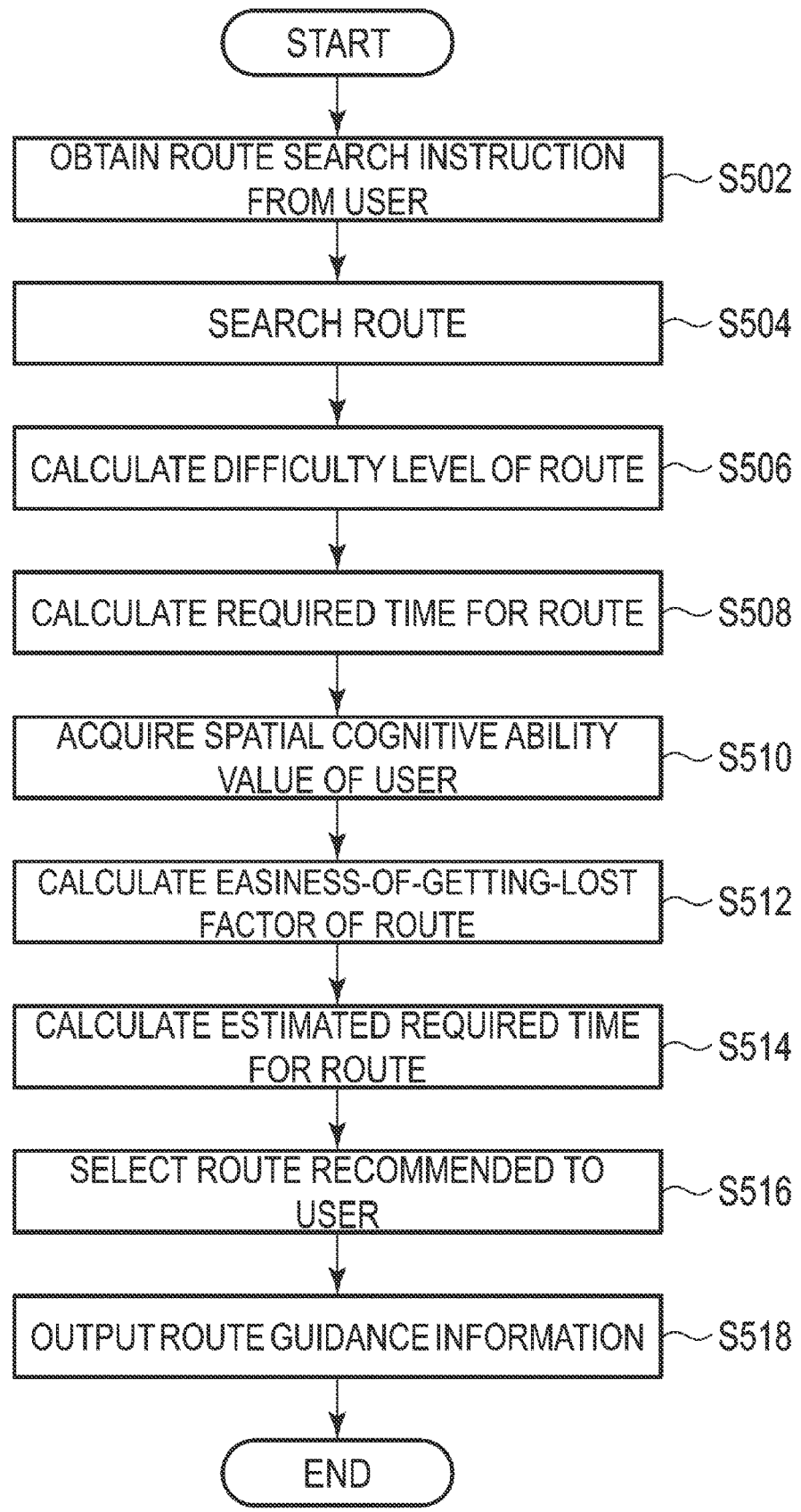
FIG. 5 is a flowchart illustrating a route guidance method according to an embodiment of the present disclosure.

FIG. 5 schematically illustrates an example of route guidance processing in the route guidance apparatus 100. In step S502 of FIG. 5, the instruction acquisition unit 102 acquires a route search instruction from the user. The route search instruction includes information indicating a departure place and a destination. In step S504, the route search unit 104 performs a route search in response to the route search instruction. The route search unit 104 searches for a route from the departure place to the destination by referring to the map information stored in the map storage unit 120. Here, it is assumed that the route search unit 104 obtains two routes of a first route and a second route as search results.

In step S506, the difficulty level calculation unit 106 calculates the difficulty level for each route. For example, the difficulty level calculation unit 106 calculates the difficulty level of the first route and the difficulty level of the second route according to the above Equation (1).

In step S508, the required time calculation unit 108 calculates the required time for each route. For example, the required time calculation unit 108 calculates the required time for the first route and the required time for the second route.

In step S510, the spatial cognitive ability value acquisition unit 110 acquires the spatial cognitive ability value of the user. For example, before the instruction acquisition unit 102 acquires the route search instruction, the spatial cognitive ability value acquisition unit 110 calculates the spatial cognitive ability value on the basis of the information input by the user and causes the storage device 408 to store the spatial cognitive ability value. In response to the instruction acquisition unit 102 acquiring the route search instruction, the spatial cognitive ability value acquisition unit 110 reads the spatial cognitive ability value of the user from the storage device 408.

In step S512, the easiness-of-getting-lost factor calculation unit 112 calculates the easiness-of-getting-lost factor for each route by applying the difficulty level of the route and the spatial cognitive ability value of the user to the estimation model 113. For example, the easiness-of-getting-lost factor calculation unit 112 inputs the difficulty level of the first route and the spatial cognitive ability value of the user to the estimation model 113 and obtains a value output from the estimation model 113 as the easiness-of-getting-lost factor of the first route. Moreover, the easiness-of-getting-lost factor calculation unit 112 inputs the difficulty level of the second route and the spatial cognitive ability value of the user to the estimation model 113 and obtains a value output from the estimation model 113 as the easiness-of-getting-lost factor of the second route.

In step S514, the estimated required time calculation unit 114 calculates the estimated required time for each route on the basis of the easiness-of-getting-lost factor of the route and the required time for the route. For example, the estimated required time calculation unit 114 obtains the getting-lost time of the first route by multiplying the required time for the first route by the easiness-of-getting-lost factor of the first route and adds the required time for the first route to the getting-lost time of the first route, thereby obtaining the estimated required time of the first route. Moreover, the estimated required time calculation unit 114 obtains the getting-lost time of the second route by multiplying the required time for the second route by the easiness-of-getting-lost factor of the second route and adds the required time for the second route to the getting-lost time of the second route, thereby obtaining the estimated required time of the second route.

In step S516, the route selection unit 116 selects a route recommended to the user from among the routes on the basis of the estimated required time for each route. For example, the route selection unit 116 selects a route having the shortest estimated required time as a route recommended to the user. For example, when the estimated required time for the first route is shorter than the estimated required time for the second route, the route selection unit 116 selects the first route.

In step S518, the output unit 118 outputs the selected route and the estimated required time for the selected route. For example, the output unit 118 displays the first route on the map, and further displays the estimated required time for the first route.

Next, the operation of the learning apparatus 300 illustrated in FIG. 3 will be described.

Figure 6:
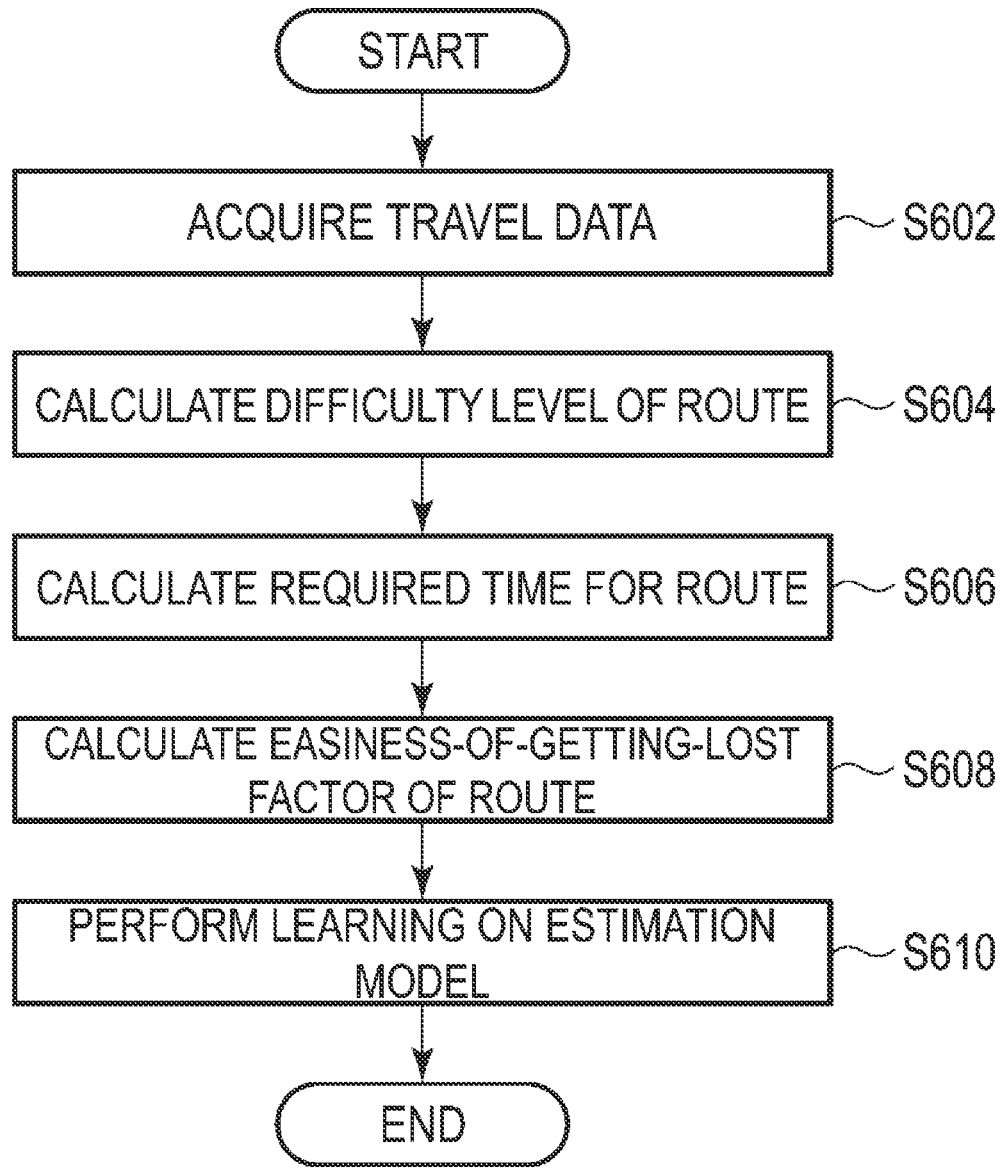
FIG. 6 is a flowchart illustrating a learning method according to an embodiment of the present disclosure.

FIG. 6 schematically illustrates an example of learning processing in the learning apparatus 300. First, the learning data acquisition unit 302 acquires learning data used to perform learning on the estimation model 113 used in the route guidance apparatus 100. The learning data includes a plurality of data sets including a difficulty level of the route, a spatial cognitive ability value of the user, and an easiness-of-getting-lost factor of the route. Acquisition of the learning data includes, for example, processing operations illustrated in steps S602, 604, and 606 in FIG. 6.

In step S602, the travel data acquisition unit 312 acquires travel data including a plurality of travel logs from one or a plurality of servers on the communication network, for example. Each travel log includes, for example, information indicating a route, a spatial cognitive ability value of the user, and an actual travel time which is a time actually taken for the user to travel the route.

Processing operations shown in steps S604, S606, and S608 subsequent to step S602 are performed for each travel log.

The learning data acquisition unit 302 selects one of the travel logs. The difficulty level calculation unit 314 calculates the difficulty level of the route indicated by the selected travel log (step S604). For example, the difficulty level calculation unit 314 calculates the difficulty level of the route according to the above Equation (1). The required time calculation unit 316 calculates the required time for the route indicated by the selected travel log (step S606). The easiness-of-getting-lost factor calculation unit 318 calculates an easiness-of-getting-lost factor on the basis of the required time calculated by the required time calculation unit 316 and the actual travel time indicated by the selected travel log (step S608). For example, the easiness-of-getting-lost factor calculation unit 318 calculates the easiness-of-getting-lost factor according to the above Equation (4). As described above, the learning data acquisition unit 302 generates one data set from one travel log.

Subsequently, the learning data acquisition unit 302 selects another one of the travel logs and performs the processing operations shown in steps S604, S606, and S608 on the route indicated by the selected travel log. By repeating this operation, the learning data acquisition unit 302 performs the processing operations shown in steps S604, S606, and S608 on all the travel logs. As a result, the learning data acquisition unit 302 generates a plurality of data sets from the plurality of travel logs.

In step S610, the learning unit 304 performs learning on the estimation model 113 by using the learning data acquired by the learning data acquisition unit 302. For example, the learning unit 304 performs learning on the estimation model 113 by supervised learning using the learning data.

As described above, the route guidance apparatus 100 selects a route to be presented to the user from among routes obtained as a search result in consideration of the spatial cognitive ability of the user. Specifically, the route guidance apparatus 100 calculates a difficulty level of the route, calculates a required time for the route, acquires a spatial cognitive ability value representing the spatial cognitive ability of the user, calculates an estimated required time for the route on the basis of the difficulty level of the route, the required time for the route, and the spatial cognitive ability value of the user, and selects a route having the shortest estimated required time from among the routes. The estimated required time is the sum of the required time and the getting-lost time. As a result, an efficient route, that is, a route in which the user is estimated to reach the destination in the shortest time is selected. As a result, it is possible to present a route suitable for the user. As a result, the user is less likely to get lost and instruct a route search again, and processor load and power consumption are reduced.

The route guidance apparatus 100 may output the required time and the getting-lost time of the route together with the route. The output of the getting-lost time provides the following advantages. The user can estimate the difficulty level of the route from the getting-lost time. For example, the user selects a route estimated to have a low difficulty level from the presented routes. This increases the possibility that the user can reach the destination without getting lost. As a result, the user is less likely to get lost and instruct a route search again, and processor load and power consumption are reduced. Moreover, it is possible to prevent the user from reaching the destination too early, so that the user can use time more effectively. Moreover, a risk time in a case where the user gets lost can be recognized in advance. Moreover, it is possible for the user to gain a sense of psychological security before departure or at the time of travel.

The route guidance apparatus 100 uses the learned estimation model 113 that outputs a value indicating the easiness-of-getting-lost factor when the route difficulty level and the spatial cognitive ability value are input. The learning apparatus 300 acquires learning data including a plurality of data sets each including a difficulty level of the route, a spatial cognitive ability value of the user who has traveled the route, and an easiness-of-getting-lost factor calculated on the basis of the required time for the route and the time actually taken for the user to travel the route and performs learning on the estimation model 113 by supervised learning using the learning data. The learned estimation model 113 makes it possible to accurately estimate the easiness of getting lost in the route for the user.

Each of the route guidance apparatus 100 and the learning apparatus 300 calculates the difficulty level of the route on the basis of the number of nodes at which turning is performed on the route, the number of nodes through which passing is performed on the route, the number of movements between floors included in the route, and the building number density in the region including the route. These elements are geospatial elements that cause people to get lost and that are extracted from the results of a survey (hearing people who are likely to get lost). By calculating the difficulty level of the route using these elements, it is possible to more accurately estimate the easiness of getting lost in the route for each user.

The present disclosure is not limited to the embodiment described above. For example, the route may include a section in which the user travels on foot and a section in which the user travels by using public transportation such as a train or a bus. In this case, the route guidance apparatus 100 calculates the getting-lost time by performing the above-described processing on the section in which the user travels on foot and calculates the estimated required time of the entire route.

The route guidance apparatus 100 may record a travel log that is a record of actual travel of the user on the route presented to the user, and the spatial cognitive ability value acquisition unit 110 may calculate the spatial cognitive ability value of the user on the basis of the travel log. For example, the spatial cognitive ability value acquisition unit 110 obtains, for each travel log, a ratio obtained by dividing the actual travel time by the required time and calculates an average thereof. The spatial cognitive ability value acquisition unit 110 sets the spatial cognitive ability value to 1 when the average value is less than 0.8, sets the spatial cognitive ability value to 2 when the average value is equal to or greater than 0.8 and less than 0.9, sets the spatial cognitive ability value to 3 when the average value is equal to or greater than 0.9 and less than 1.1, sets the spatial cognitive ability value to 4 when the average value is equal to or greater than 1.1 and less than 1.2, and sets the spatial cognitive ability value to 5 when the average value is equal to or greater than 1.2.

The spatial cognitive ability value acquisition unit 110 may use the travel log recorded by the route guidance apparatus 100 to update the spatial cognitive ability value calculated on the basis of the questionnaire. By calculating or updating the spatial cognitive ability value of the user on the basis of the travel log related to the user, it is possible to obtain the spatial cognitive ability value that appropriately reflects the spatial cognitive ability of the user.

The present disclosure is not limited to the above-mentioned embodiment but can be variously modified in the implementation stage without departing from the gist of the present disclosure. In addition, an appropriate combination of embodiments can also be implemented, in which case a combination of their effects can be obtained. Moreover, the above-mentioned embodiment includes various disclosures, which can be extracted by combining constituent requirements selected from a plurality of disclosed constituent requirements. For example, a configuration in which some constituent requirements are removed from all the constituent requirements illustrated in the embodiment can be extracted as a disclosure if the problems can be solved and the effects can be achieved.

REFERENCE SIGNS LIST

100 Route guidance apparatus
102 Instruction acquisition unit
104 Route search unit
106 Difficulty level calculation unit
108 Required time calculation unit
110 Spatial cognitive ability value acquisition unit
112 Easiness-of-getting-lost factor calculation unit
113 Estimation model
114 Estimated required time calculation unit
116 Route selection unit
118 Output unit
120 Map storage unit
201, 202 Geographic mesh
300 Learning apparatus
302 Learning data acquisition unit
304 Learning unit
306 Map storage unit
312 Travel data acquisition unit
314 Difficulty level calculation unit
316 Required time calculation unit
318 Easiness-of-getting-lost factor calculation unit
400 Computer apparatus
402 Processor
404 RAM
406 Program memory
408 Storage device
410 Input and output interface
412 Bus

The invention claimed is:

1. A route guidance apparatus comprising:
a processor configured to:
  perform a route search based on a route search instruction, from a user, including information indicating a departure place and a destination, wherein the user is a pedestrian walking from the departure place to the destination;
  calculate, for each route of a plurality of routes obtained as a search result of the route search, a difficulty level;
  calculate, for each route of the plurality of routes, a required time;
  acquire a spatial cognitive ability value representing a spatial cognitive ability of the user;
  calculate, for each route of the plurality of routes, an easiness-of-getting-lost factor representing a likelihood that the user will get lost in the route in accordance with the difficulty level for the route and the spatial cognitive ability value, wherein the easiness-of-getting-lost factor of the route represents the likelihood that the user will get lost in the route prior to the user traveling in the route;
  calculate, for each route of the plurality of routes, an estimated required time that is a time estimated to be taken by the user to travel from the departure place to the destination in accordance with the easiness-of-getting-lost factor and the required time;
  select a route recommended to the user from the plurality of routes that has a minimum estimated required time among the estimated required times that are calculated;
  provide route guidance information indicating the selected route and the estimated required time for the selected route; and
output, to the user, the selected route and the estimated required time for the selected route.

2. The route guidance apparatus according to claim 1, wherein the processor is further configured to output a getting-lost time that is a difference between the estimated required time for the selected route and the required time for the selected route.

3. The route guidance apparatus according to claim 1, wherein the processor is further configured to apply the difficulty level that is calculated and the spatial cognitive ability value that is acquired to a learned estimation model to obtain a value output from the learned estimation model as the easiness-of-getting-lost factor.

4. The route guidance apparatus according to claim 1, wherein the processor is further configured to calculate, for each route of the plurality of routes, the difficulty level based on at least one of a number of nodes where turning is performed on the route, a number of nodes where passing is performed on the route, a number of movements between floors included in the route, or a building number density in a region including the route.

5. A non-transitory computer-readable medium having computer-executable instructions that, upon execution of the instructions by the processor of a computer, cause the computer to function as the route guidance apparatus according to claim 1.

6. The route guidance apparatus according to claim 1, wherein the processor is further configured to calculate, for each route of the plurality of routes, the difficulty level based on one or more of a number of nodes at which turning is performed on the route, a number of nodes through which passing is performed on the route, a number of movements between floors included in the route, and a building number density in a geographic mesh including the route.

7. A route guidance method performed by a route guidance apparatus, the method comprising:
performing a route search based on a route search instruction, from a user, including information indicating a departure place and a destination, wherein the user is a pedestrian walking from the departure place to the destination;
calculating, for each route of a plurality of routes obtained as a search result of the route search, a difficulty level;
calculating, for each route the plurality of routes, a required time;
acquiring a spatial cognitive ability value representing a spatial cognitive ability of the user;
calculating, for each route of the plurality of routes, an easiness-of-getting-lost factor representing a likelihood that the user will get lost in the route in accordance with the difficulty level for the route and the spatial cognitive ability value, wherein the easiness-of-getting-lost factor of the route represents the likelihood that the user will get lost in the route prior to the user traveling in the route;
calculating, for each route of the plurality of routes, an estimated required time that is a time estimated to be taken by the user to travel from the departure place to the destination in accordance with the easiness-of-getting-lost factor and the required time;
selecting a route recommended to the user from the plurality of routes that has a minimum estimated required time among the estimated required times that are calculated;
providing route guidance information indicating the selected route and the estimated required time for the selected route; and
outputting, to the user, the selected route and the estimated required time for the selected route.

* * * * *